April 23, 1968  W. W. WAHLGREN  3,378,955
SUN SCREEN
Filed Sept. 14, 1965
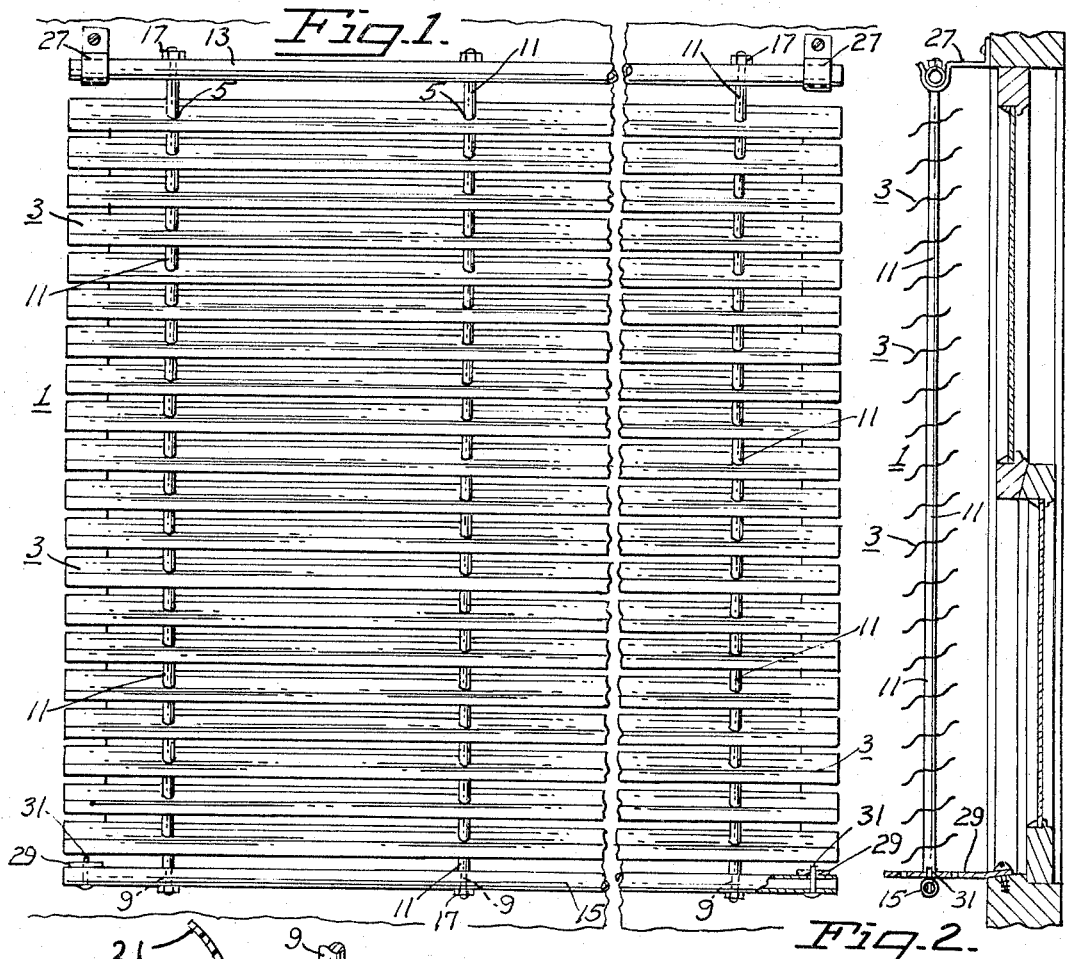
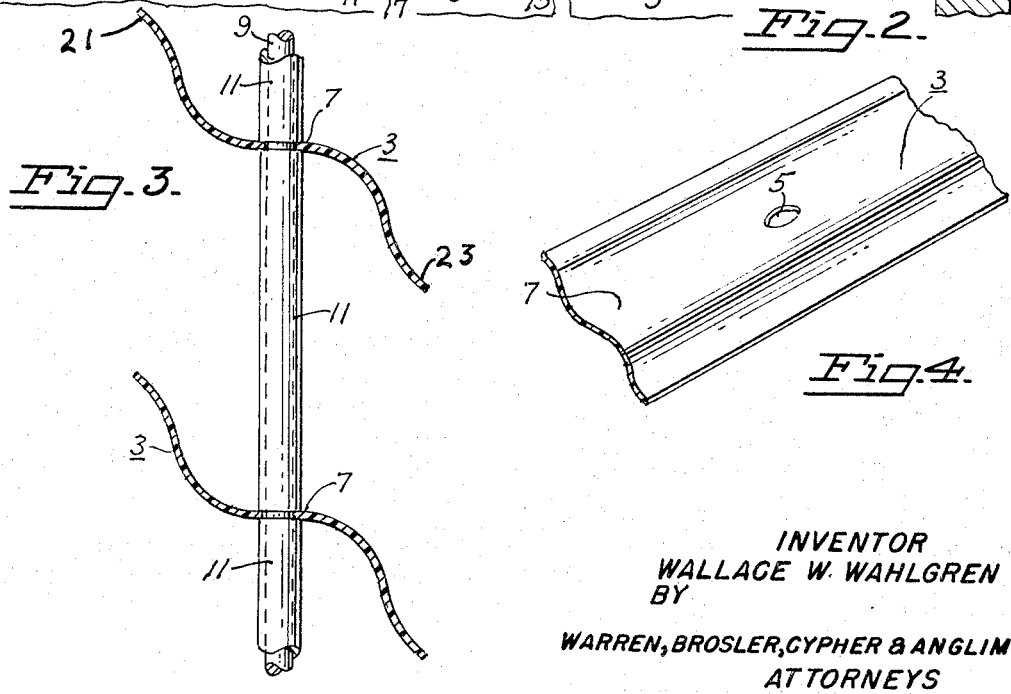
INVENTOR
WALLACE W. WAHLGREN
BY
WARREN, BROSLER, CYPHER & ANGLIM
ATTORNEYS

United States Patent Office 3,378,955
Patented Apr. 23, 1968

3,378,955
SUN SCREEN
Wallace W. Wahlgren, 15 Marr Ave.,
Oakland, Calif. 94611
Filed Sept. 14, 1965, Ser. No. 487,222
4 Claims. (Cl. 49—397)

ABSTRACT OF THE DISCLOSURE

An externally mountable sun screen made up of horizontal, preferable translucent louvres, angled to intercept and filter out the heat of the sun while transmitting directly and by reflection, in dispersed form, both the direct light rays from the sun and reflected light from the sky and environment, the louvres being certically spaced to permit clear and direct horizontal viewing.

My invention relates to screens and more particularly to sun screens.

To the householder and indoor worker, the sun beating in through windows is the cause of many problems such as glare, excessive heat, fading and/or destruction of drapes, rugs, painted of shellacked surfaces . . . etc.

Various attempts have been made to solve one or the other of such problems, such as the use of awnings, air conditioning apparatus, venetian blinds, roller shades . . . ets. Even drapes which serve a decorative function in the home or office, are, in part, relied on as a protection against sun. Most of these only partially solve the problems involved, and may be quite expensive in initial cost and operation.

The present invention solves these and other problems by providing an externally mountable sun screen made up of horizontal, preferably translucent louvers, vertically spaced from each other sufficiently to provide clear and direct horizontal viewing therethrough, while intercepting and filtering out the heat rays of the sun, and transmitting directly and by reflection, in dispersed form, direct light rays from the sun and reflected light from the sky and environment.

Among the objects of my invention are:

(1) To provide a novel and improved sun screen for windows and the like;

(2) To provide a novel and improved sun screen of low cost and light weight which will not only screen out the sun's rays but, at the same time, will screen out the heat carried by such rays:

(3) To provide a novel and improved sun screen for mounting externally of a structure, to screen both the sun's rays and associated heat, while permitting adequate viewing therethrough;

(4) To provide a novel and improved sun screen which will actually transmit more light to an otherwise shaded area behind such screen than would otherwise reach such area in the absence of such screen;

(5) To provide a novel and improved sun screen adapted for mounting externally of a structure and which is of sufficient rigidity to withstand vibration in response to air movements;

(6) To provide a novel and improved sun screen adapted for mounting externally of a structure and capable of permitting adequate viewing therethrough, while blocking passage of the direct rays of the sun, the screen being adjustable to accomplish such function;

(7) To provide a novel and improved sun screen which shall be pleasing to the eye, and one which is capable of being manufactured of materials adapted to more or less blend with the surroundings and thus not produce any harsh reactions when brought into one's view;

(8) To provide a novel and improved sun screen adapted for mounting externally of the structure and which will have an enhancing architectural effect when so mounted.

Additional objects of my invention will be brought out in the following description of a prefered embodiment of the same, taken in conjunction with the accompanying drawings, wherein FIGURE 1 is a front view in elevation of a sun screen embodying the present invention, shown installed across the window of a structure;

FIGURE 2 is an end view of the sun screen of FIGURE 1, in its installed position;

FIGURE 3 is an enlarged fragmentary view in section through the screen of FIGURE 1; and FIGURE 4 is a three-dimensional fragmentary view of one of the many louvres involved in the construction of the screen of the preceding figures.

Referring to the drawing for details of my invention in its preferred form, the sun screen illustrated comprises a louvre assembly 1 including a plurality of louvres 3, each preferably of corrugated section of approximately one and one-half cycles, and provided with longitudinally spaced holes 5 along substantially the mid-length thereof. This will place the holes along a substantially flat longitudinal mid-section 7 of each louvre.

A plurality of such louvres may be fixedly supported in parallel spaced relationship by means including a plurality of rods 9 passing through corresponding holes in such louvres, with spacer sleeves 11 on such rods between louvres, the louvres being stabilized in such assembly by clamping means applied to the assembled sleeves.

Such clamping means, in the specific embodiment illustrated, takes the form of an upper tube 13 provided with correspondingly spaced holes through which the rods at one end pass, and a similar tube 15 at the lower end with like holes through which the rods at their other end 5 pass, the rods being threaded at each end to receive clamping nuts 17. If desired, spacer sleeves may be installed between each end louvre and the proximate tube.

With the louvres thus mounted, the edge 21 of each, to one side of the mid-section 7, will turn up, while the edge 23 to the other side of said mid-section, will tip down. The sun's rays striking the lower edge 23 of a louvre from an elevated position will cast a shadow thereof in the direction of the turned up edge of the louvre immediately below. This permits of the utilization of spacer sleeves of a length sufficient to create a horizontal view space between successive louvres, and yet create overlapping of the louvres in line with the sun's rays. Thus, not only will one have a view horizontally through the screen, but also a wide angle of view in the downward direction, along with some viewing range in the upward direction within the limits of the horizontal view space thus provided, and all this while the sun's rays are completely screened.

The louvre assembly as thus described is adapted for mounting across a window or like area externally of a structure, and in such spaced relationship from such area as to permit of opening of windows or the like, should they be of a type designed for opening outwardly.

The mounting should preferably be one which allows of pivoting the louvre assembly at its upper end, whereby to permit of some adjustment of the effective spacing between the louvres with respect to the sun's position in the sky and without actually altering the physical spacing between louvres. Such adjustments may be made seasonally, and when once adjusted, need not be changed during any particular day.

As one example of such type of mounting, a pair of brackets 27 affixed to the wall of the supporting structure, may terminate in semi-circular ends to receive and cradle the upper tube 13, and the louvre assembly when thus suspended, may be adjustably stabilized from its lower end by one or more resilient clips 29 or the like secured at one end to the window sill or equivalent structure, and each provided at its free end with a series of holes to selectively engage a stud 31 or the like provided on the lower tube of the louvre assembly, whereby the vertical angle of the louvre assembly may be altered within adequate limits to accomplish the such screen adjustments.

While many of the advantages attributable to the present invention may be realized with louvres of metal or other opaque material, additional and improved results are obtainable through the use of louvres of translucent material. Fiberglass or other plastic materials such as is employed in the fabrication of corrugated sheeting for roof structures or patio covers are suitable for the purpose, and these come in various colors and degrees of translucency.

Louvres of such material will not only enhance the architectural effect of the sun screen when installed on a structure, but what is probably of even greater importance, applicant has found that the screen will block out, from entering a window, all direct heat rays of the sun while actually increasing the amount of light entering any portion of the window which would otherwise be shaded from the direct rays of the sun, as by an overhanging eave for example.

In an actual installation, for example, and with a bright sun in the sky, the temperature taken about a foot within a room from a window opening covered by a screen embodying the present invention and shaded by an overhanding eave of a roof was indicated on a thermometer to be somewhat under 80° Fahrenheit, while the temperature taken under similar conditions at a like point but without the use of a sun screen, registered approximately 90° Fahrenheit.

At the same points, light readings were taken with a light meter. Whereas the light reading without the sun screen registered 38 on the light scale, it is quite significant to note that, with the installation of the screen, the light intensity actually increased to a reading of 52 on the light scale.

Such tests thus definitely establish that through the use of applicant's sun screen, not only will the temperature conditions within a room at a point otherwise shaded from direct sunlight, be substantially cooler, but such areas will receive considerably more light.

In analyzing the invention for an explanation of these striking effects, it appears that insofar as the heat dissipation is concerned, the screen being installed in spaced relationship to the window, and externally of the building, will absorb the direct heat from the sun's rays and thus not permit the same to enter through such window. Ventilation permitted by the spaced louvres, will serve to adequately dissipate such heat to the surrounding external atmosphere.

Insofar as the striking increase in light through the window is concerned, this it is believed, may be attributable to two effects. If the louvres are of translucent material, a considerable portion of the light from the sun's rays will pass through without glare, due to dispersion of light entering such louvres.

Supplementary to this, it is believed that indirect sunlight, such as light approaching from the sky or light reflected from surrounding areas, will approach and strike the louvres at different angles, a considerable portion of which light, will either pass directly through the screen between the louvres thereof, or will strike the various angular surfaces of the louvres and be reflected through the screen from the surfaces thereof.

In any event, the aforementioned tests definitely establish that the screen of the present invention is not only capable of reducing the temperature which might otherwise develop within a room, but can actually increase the amount of light entering such room in areas not exposed directly to sunlight. The degrees to which these results may be realized, and particularly with respect to the light effect, will increase with translucency of the material, and this will have the added effect of blending to a greater degree, the louvres with the surroundings, so as to minimize the eye reactions one experiences when confronted with opaque stripes across a light background as, for example, when looking into open spaces through venetian blinds. To the extent such marked contrasts are thus avoided, eye strain is proportionately reduced.

From the foregoing description of my invention in its preferred form, it will be apparent that the same fulfills all the objects thereof, and while I have illustrated and described the same in considerable detail, it is apparent that the same is subject to alteration and modification without departing from the underlying principles involved, and I, accordingly, do not desire to be limited in my protection to the specific details illustrated and described, except as may be necessitated by the appended claims.

I claim:
1. A sun screen comprising
   a louvre assembly including a plurality of louvres, and means fixedly supporting said louvres in horizontal parallel spaced relationship, the spacing between louvres being such as to create a horizontal view space between louvres and yet cause overlapping of louvres in line with the sun's rays, to intercept and filter out the heat rays of the sun, said louvres being of translucent material to permit both direct and indirect transmission and dispersion of direct light rays from the sun and reflected light from the sky and environment,
   and means for mounting said louvre assembly on the exterior of a building in spaced relationship to a wall thereof.
2. A sun screen in accordance with claim 1, characterized by said louvres being of plastic.
3. A sun screen in accordance with claim 2, characterized by said plastic louvres being of corrugated section of approximately one and a half cycles.
4. A sun screen in accordance with claim 2, characterized by means providing for angular adjustment of said screen from a vertical suspended position.

References Cited

UNITED STATES PATENTS

| | | | |
|---|---|---|---|
| 326,371 | 9/1885 | Wilson | 52—473 |
| 1,646,522 | 10/1927 | Berg | 49—67 X |
| 2,015,342 | 9/1935 | Indahl | 52—78 |
| 2,083,681 | 6/1937 | Baldwin | 52—473 |
| 2,364,378 | 12/1944 | Levinsen | 98—121 |
| 2,458,619 | 1/1949 | McKinley | 52—78 |
| 2,731,686 | 1/1956 | Ball | 52—74 |
| 2,882,563 | 4/1959 | McCormick | 49—74 X |
| 2,925,457 | 2/1960 | Lindgren | 98—121 X |
| 3,072,230 | 1/1963 | Gelert | 52—473 |

DAVID J. WILLIAMOWSKY, *Primary Examiner.*

P. C. KANNAN, *Assistant Examiner.*